Aug. 23, 1960 C. J. FLETCHER 2,949,737
HELICOPTER INCLUDING A JET DRIVEN ROTOR AND DRIVE SYSTEM
Original Filed Nov. 5, 1953 3 Sheets-Sheet 3

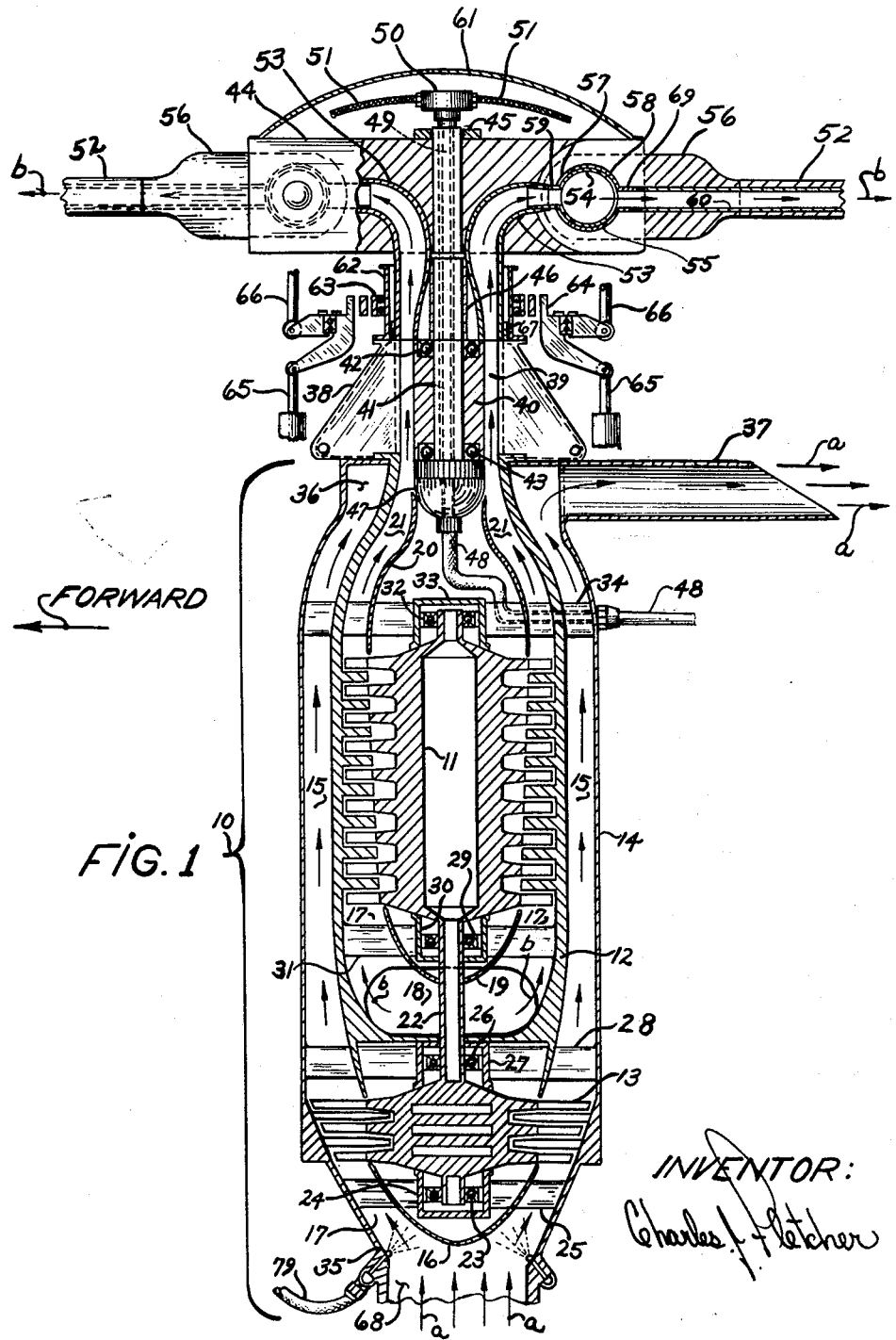

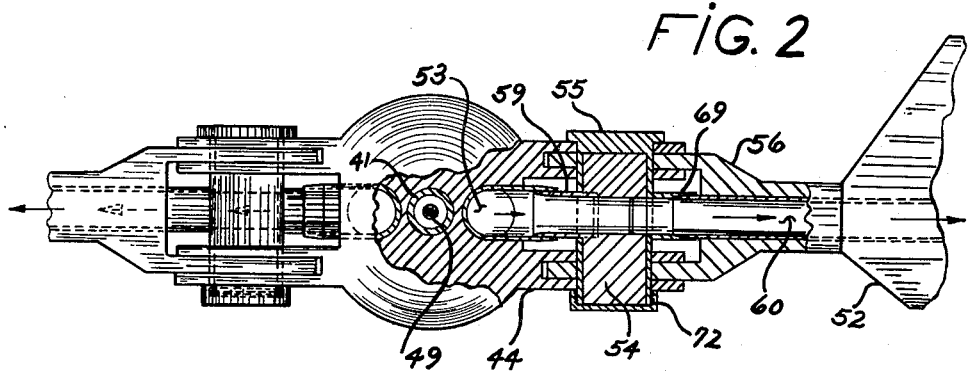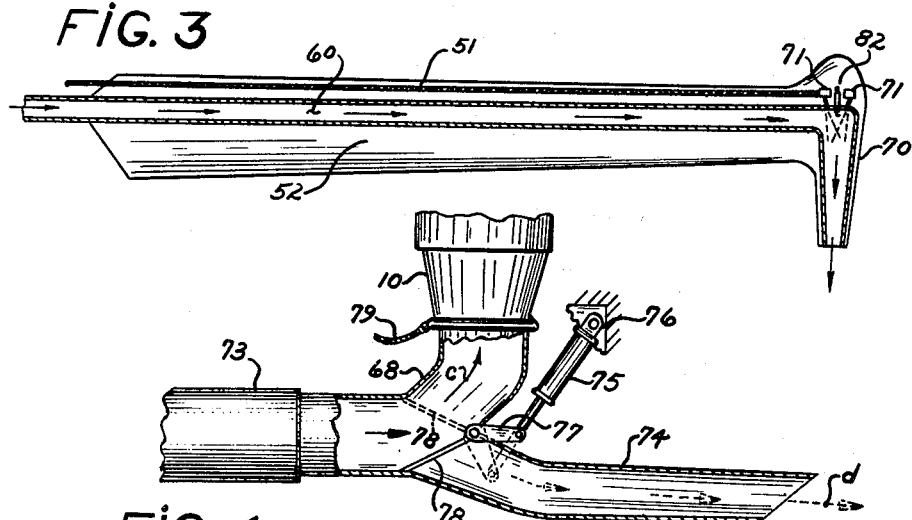

Charles J. Fletcher  INVENTOR

United States Patent Office 2,949,737
Patented Aug. 23, 1960

2,949,737

HELICOPTER INCLUDING A JET DRIVEN ROTOR AND DRIVE SYSTEM

Charles J. Fletcher, Sparta, N.J., assignor to Fletch-Aire Company, Inc., Sparta, N.J., a corporation of New Jersey Continuation of abandoned application Ser. No. 390,299, Nov. 5, 1953. This application Oct. 4, 1957, Ser. No. 690,175

2 Claims. (Cl. 60—39.35)

This invention relates to aircraft and especially to aircraft in which the propeller is rotated by the reaction of the jets that issue from the blades of the propeller or from conduits secured to the blade. This application is a continuation of my application Serial No. 390,299 filed November 5, 1953, and now abandoned, and relates more particularly to helicopters and the term "propeller" is used in a broad sense to include helicopter rotors.

Numerous advantages of the helicopter are well recognized, particularly its ability to hover, and to rise and land vertically. Efficiencies of helicopters tend to be low, however, when hovering or in vertical flight because under such conditions there is no translatory movement of the rotor to increase the lift, and tip losses are high when the rotor is operated fast enough to compensate for the loss in lift that results from the lack of translatory movement. Since it is essential that a helicopter have sufficient power for vertical flight, and since the power has not been used efficiently under such circumstances, helicopters have had larger engines and have been heavier and more costly than would otherwise be necessary.

The principal object of this invention is to provide an improved aircraft of the convertiplane type that has its power system combined with auxiliary means for providing the additional power required for take-off, and, in the case of the helicopter, for vertical flight.

Another object is the provision of a simplified device for propulsion whereby a rotor compressor jet unit is utilized in supplying compressed air to pod jet engines mounted at the tip portion of rotor blades for driving the rotor independently of the main power source to eliminate any reactive torque within the rotor system.

Still another object is to provide free wheeling quality between the stationary and rotating portions of the rotor during a period when the rotor compressor jet unit is not functioning.

A further object is the provision of an advantageous control for the exhaust gases derived from the main power source in order that said gases may be used either to drive the component of the rotor and rotor drive system or to increase the thrust of the aircraft during forward flight.

A further object is to provide a rotor compressor jet unit consisting primarily of a turbine and compressor independently housed within separate shells.

Another object is to provide means for utilizing the exhaust gases derived from the main power source in order that they may be properly ducted to the greatest advantage for a given flight condition.

Still another object is to provide afterburning of the exhaust gases derived from the main power source prior to said gases entering the turbine portion of the rotor compressor jet unit, thereby increasing the thrust necessary to drive the compressor.

A further object is the provision of a unique rotor blade attachment assembly that permits the highly compressed air to be conducted from the rotor to the rotor blade without leakage.

Still a further object is to provide a rotor compressor jet unit that utilizes the hot exhaust gases derived from a main power source, such as a turbo prop engine, to drive a turbine component, which in turn drives a compressor component and thermally heats fresh air during compression, and wherein the exhaust gases and fresh air never mix throughout the jet unit cycle.

These and other objects will be apparent as the specification is considered with the accompanying drawings, wherein—

Figure 1 is an enlarged sectional view of the rotor compressor jet unit, including a partly broken away view of the rotor showing connections for supplying fuel and compressed air to the rotor blades;

Figure 2 is a partly broken away sectional plan view of the rotor showing primarily the rotor blade attachment and arrangement for transferring compressed air from the rotor to the rotor blades;

Figure 3 is a plan view of the rotor blade showing a cross section of the compressed air passage extending spanwise through the blade. The fuel line is also shown extending spanwise through the blade and attached to the fuel metering unit positioned at the upstream end of the pod jet chamber;

Figure 5:
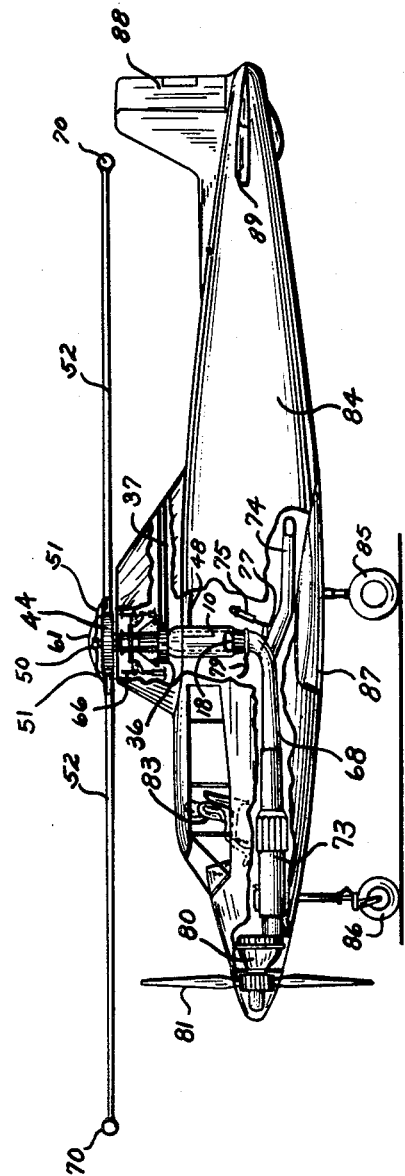

Figure 4 is a partly broken away view of the exhaust duct arrangement adapted for directing the flow exhaust gases generated from the main power source either to the atmosphere or a rotor compressor jet unit, the latter of which generates highly compressed thermally heated air used for driving the rotor; and Figure 5 is a side elevation of the helicopter type convertiplane, illustrating the complete arrangement of all the components shown in Figures 1 through 4.

In the preferred embodiment of the invention, a helicopter type convertiplane has a jet operated rotor, and the additional power for take offs and vertical flight is obtained by supplying pod jets mounted at the tip portion of the rotor blades with highly compressed and thermally heated air provided by a unique rotor compressor jet unit.

Referring more particularly to the drawings, wherein similar reference characters designate like parts throughout the several views, numeral 10 denotes a rotor compressor unit including a coaxial combination embodying an axial flow compressor 11 enclosed by an inner shell 12. An axial flow turbine 13 is positioned below the compressor 11 and is enclosed by an outer shell 14 which extends upwardly around the inner shell 12 defining therebetween an annular passage 15. A hollow conical shell 16 is suitably supported in shell 14 with its end adjacent to the lower blades of an axial gas turbine 13 thus forming an annular inlet passage 17 for the turbine 13, and an inlet passage 18 leading from the exterior of the aircraft, not shown, for receiving the air being pumped by the axial flow compressor 11. A hollow conical shell 19 is suitably supported in the inner shell 12 with its upper end adjacent to the lower blades of axial compressor 11 to form an annular inlet passage for the compressor. A conical shell 20 is also suitably supported in shell 12 with a divergent upper end and having its lower end adjacent to the upper compressor blades thereby forming an annular outlet passage 21 for conducting air generated by the compressor 11. A hollow shaft 22 drivingly connects the turbine 13 and compressor 11.

The lower end of the shaft of the turbine 13 is supported in a bearing 23, in turn supported from a casing 24 by means of a circumferential series of struts 25 also adapted to support conical shell 16 within the outer shell 14. A bearing 26 provides the upper support for the turbine 13 which is in turn supported from a casing 27 by means of a circumferential series of struts 28 also adapted to support the inner and outer shells 12 and 14. A bearing 29 provides the lower support for the compressor 11, with the latter being supported from a casing 30 by means of a circumferential series of struts 31 which support the conical shell 19. The upper end of the shaft of the compressor 11 is supported in a bearing 32, in turn supported from a casing 33 by means of a circumferential series of struts 34 also used for supporting inner and outer shells 12 and 14.

The lower portion of the rotor compressor jet unit 10 has a series of annular fuel injectors 35 circumferentially positioned on the lower portion of outer shell 14 for dispersing raw fuel into annular inlet passage 17. The upper portion of the outer shell 14 is provided with an annular manifold 36 and exhaust duct 37 for conducting the hot gases rearwardly into the free air stream.

Suitably supported above the manifold 36 is a rotor support housing 38 provided with an annular passage 39 which receives the compressed air from the compressor 11. A tubular inner portion 40 of the rotor support housing 38 has a rotor shaft 41 extending therethrough which rides on suitable bearings 42 and 43. A rotor 44 is attached to the upper portion of rotor shaft 41 and is secured in place by a threaded nut 45 with a tubular spacer sleeve 46 being provided to support the rotor above rotor support housing 38. A fuel coupling 47, including adequate fuel seals within, not shown, is suitably arranged on the lower portion of the hollow rotor shaft 41, and a fuel line 48, housed within one of the circumferential struts 34 and extending between the coupling 47 and a source of fuel, not shown, serves to conduct fuel to the stationary portion of the fuel coupling 47. A flexible fuel line 49, shown in dotted lines in Fig. 1, is housed within the hollow rotor shaft 41 and drivingly connects the rotating portion of fuel coupling 47 and a fuel T 50 whereby the latter rotates in unity with the rotor 44 and distributes fuel through a rotor blade 52 by means of fuel lines 51 connected to the pod jet fuel metering units 70, illustrated in Figure 3, arranged at the tip portion of each rotor blade not shown.

Rotor 44, drivingly attached to rotor shaft 41, is provided with compressed air ducts 53 having their lower ends adjacently aligned with the annular passage 39. As best shown in Figures 1 and 2, an inner sleeve extension tube 59, integrally formed on a hollow stationary inner sleeve 54, is fixedly attached to the upper end of each compressed air duct 53. A hollow horizontal pin 55, suitably arranged on an extension tube 69, houses the stationary inner sleeve 54 and secures a rotor blade yoke 56 to rotor 44. An elongated opening 57 arranged in the inboard side of the hollow horizontal pin 55 permits the latter to pivot without interference with the inner sleeve extension tube 59. Another elongated opening 58 arranged in the outboard side of inner sleeve 54 permits the compressed gases to flow unrestricted through the horizontal pin assembly into a rotor blade duct 60 fixedly attached to the extension tube 69. A conical shell 61 encloses the upper portion of rotor 44 and provides streamlining for the latter.

A tubular construction 62 attached to the upper end of rotor support housing 38 provides a smooth cylindrical surface for a bearing 63 constituting an integral portion of a swash plate assembly 64. Actuating links 65 are interconnected with the pilot control stick, not shown, and the swash plate 64 to actuate the latter assembly. Rotor blade pitch links 66, attached to the swash plate assembly 64, provide means for controlling the rotor blades 52 throughout the azimuth of rotation. Annular seals 67, positioned around the lower inside portion of the tubular construction 62, provide a substantially gas tight surface between the rotor support housing 38, tubular construction 62 and compressed air ducts 53.

The rotor motive unit 10 is started by directing the exhaust gases from a main power source, such as turbo prop engine, upward through an exhaust gas duct 68. Fuel from a fuel line 79 pressurizes the series of annular fuel injectors 35 and injects fuel into the exhaust gas stream, which in turn provides for thrust augmentation at a rate controlled by the pilot. As the hot gases leave conduit 68 with added thrust, the gases enter annular inlet passage 17 and drive gas turbine 13, which in turn drives compressor 11. With the compressor 11 operating, air from a scoop located outside the aircraft, not shown, pumps air from the atmosphere, through the inlet duct 18, where the air is further directed through the annular inlet passage 17 and enters the compressor 11 which in turn discharges the compressed air into the compressor annular outlet passage 21.

As the atmospheric air is compressed by compressor 11 and is discharged into the annular outlet passage 21 thereof, the exhaust gases being discharged from gas turbine 13 are directed through the outer annular passage 15, thermally heating the inner shell 12 which in turn provides heat radiation to the air being conducted through the inlet duct 18, compressor 11 and annular outlet passage 21, respectively. Thereafter, the exhaust gases, being discharged by the outer annular passage 15, enter the chamber of the annular exhaust gas manifold 36 and are discharged to the atmosphere through the exhaust gas duct 37. The annular passage 15, formed by the construction of the inner and outer shells 12 and 14, serves as an effective heat exchanger for increasing the energy of the compressed air stream prior to being discharged through the rotor 44, rotor blades 52 and pod jets, not shown, where the latter expels the compressed gases rearward for driving the rotor.

Arrows designated a in Fig. 1 indicates the flow path of the hot exhaust gases through the rotor compressor jet unit 10, and arrows designated b indicate the flow path of the compressed air through the compressor portion of rotor compressor jet unit 10, rotor 44 and rotor blades 52, respectively. Rotor compressed air ducts 53, rotating in unity with the rotor 44, receive the compressed air from annular passage 39 which in turn directs the flow through the horizontal pin assembly and into rotor duct 60, where the compressed air is further transmitted to the pod jet chamber, not shown. Referring to Figures 1 and 3, fuel for the jet driven rotor is supplied from a tank within the aircraft fuselage, not shown, and is conducted to the rotor blade pod jets 70 under pressure through the fuel line 48, stationary and rotatable portions of the fuel coupling 47, rotatable fuel line 49, shown in dotted lines (Fig. 1), and into the rotatable fuel T 50. This results in the equitable distribution of the fuel into flexible fuel lines 51, housed within the rotor blade 52 and connected to a pod jet fuel injector 71 (Fig. 3), where the rate of fuel flow is regulated by the pilot. A spark plug 82 (Fig. 3), mounted within the forward portion of the pod jet unit 70, ignites the mixture of combustible gases to produce thrust rearward for driving the rotor 44.

The partially broken away view of the rotor shown in Figure 2 shows the rotor blade yoke 56 securely attached to the hub portion of rotor 44 by means of the horizontal pin assembly 55 consisting of hollow horizontal pin 55, hollow inner sleeve 54 and a threaded nut 72. Rotor compressed air duct 53 is attached to the extension tube 59 of stationary inner sleeve 54, and the inboard end of the rotor blade compressed air duct 60 is attached to the extension tube 69 of the horizontal pin 55. As the rotor blade flapping motion is induced through normal operation of the rotor 44, the extension tube 69, securely attached to the rotor blade compressed air duct 60, acts a moment arm for rotating the horizontal outer pin 55. This unique construction permits the compressed air to pass from the rotor compressed air duct 53 to the rotor blade duct 60 throughout any angle of rotor blade flap. The flexible fuel line 49 is housed within the hollow center portion of rotor shaft 41, and the arrows designate the direction of flow of compressed air being generated from within the compressor jet unit, not shown.

Referring to Figure 4, annular exhaust duct 68 connects the exhaust end of a gas turbine engine 73 and the lower portion of the rotor compressor jet unit 10. A horizontal intermediate duct 74 is connected to duct 68 at its elbow portion, and an actuator 75, fixedly attached to the aircraft structure 76, operates a bell crank 77 which in turn actuates a control gate 78. The solid arrow c indicates the flow direction of hot exhaust gases to the rotor compressor jet unit 10 when the control gate 78 is in the downward position. The fuel line 79, connected to the lower portion of the rotor compressor jet unit 10, conducts fuel under pressure to a series of annular fuel injectors, not shown, where the latter injects fuel into the hot exhaust gas stream at a rate controlled by the pilot for the purpose of inducing thrust augmentation prior to the hot gases entering the turbine portion of the rotor compressor jet unit 10. During the forward flight condition, control gate 78 is placed in the upward dotted line position to direct the flow of exhaust gas in the direction of dotted arrows d through rearwardly extended exhaust duct 74 whereupon fuel for the injectors 35 and exhaust gases for driving rotor compressor jet unit 10 are simultaneously cut off. The latter positioning of the control gate 78 further permits the reaction of the escaping exhaust gas stream through exhaust duct 74 to increase the forward thrust of the aircraft and permits free wheeling of rotor 44, thus saving fuel and increasing the overall efficiency of the aircraft for a given flight condition.

As shown in Figure 5, mounted within the aircraft fuselage 84 is the gas turbine 73 drivingly connected at its forward end by a reduction gear box 80, which in turn drives a propeller 81. The exhaust gas conduit 68 extends between the rearward portion of gas turbine 73 and the lower portion of the rotor compressor jet unit 10. The horizontal exhaust gas conduit 74 extends to the lower rear portion of the exhaust conduit 68 and conducts the exhaust gases from the main power source during forward flight. Actuator 75 is connected to bell crank 77 for positioning a gas control gate, not shown, in order to direct the flow of hot exhaust gases from the main power source to the rotor compressor jet unit 10, during vertical and transitional flight, or through the horizontal exhaust gas conduit 74 during forward flight. The fuel line 79 is attached to the fuel injectors, mounted within the lower portion of rotor compressor jet unit 10, for dispersing fuel into the hot exhaust gases generated from the main power source 73 to provide thrust augmentation to the gas stream prior to the gases entering the turbine portion, not shown, of the motive unit 10. Compressor inlet duct 18 is located at the lower portion of the rotor compressor jet unit 10 for conducting air from the atmosphere to the compressor. Annular manifold conduit 36 is arranged at the upper portion of the rotor compressor jet unit 10 and receives the expended exhaust gases from the turbine and communicates with the exhaust conduit 37 for discharging the exhaust gases to the atmosphere. Compressed air from the high pressure compressor, not shown, within the rotor compressor jet unit 10 conducts the compressed air into the rotor 44 where it is further transmitted through the rotor blades 52 into the pod jets 70. Fuel lines 51 receive fuel under pressure from a tank, not shown, within the fuselage and conduct the fuel to the upstream portion to pod jets 70, where it is injected into and completely mixed with the highly compressed air to a state suitable for combustion. The pilot 83 is shown in Fig. 5 positioned within the upper forward portion of the fuselage 84, and the main wheels 85 are of the retractable type and are shown in the extended position. A fixed wing 87 is attached to the lower central portion of fuselage 84, and a vertical tail 88 and horziontal tail 89 of the aircraft are mounted at the rearward portion of the fuselage to provide stability for the aircraft during transitional and forward flight.

It will be understood that the above illustrations and descriptions of the construction and arrangements of the inter-connecting moving and stationary parts form a typical configuration embodying new and salient features hereinafter claimed, but that modifications may be made of the construction and arrangement of parts without departing from the spirit of the invention.

What I claim is:

1. In an aircraft provided with a conventional combustion engine, radially extending rotors, and a jet unit mounted in the outer end of each of said rotors, the provision of means for furnishing a working fluid to said jet units, said means comprising a first cylindrical housing, a second cylindrical housing annularly spaced within said first cylindrical housing, a shaft axially positioned within said first and second cylindrical housings, an air intake conduit passing through said first cylindrical housing and communicating with said second cylindrical housing, an air compressor mounted on said shaft and arranged in said second cylindrical housing, a turbine affixed to said shaft within said first cylindrical housing, an exhaust gas conduit interconnecting one end of said first cylindrical housing and said conventional engine, an exhaust pipe connected to the other end of said first cylindrical housing, a plurality of fuel injectors mounted in the first cylindrical housing immediately inwardly of its juncture with said exhaust gas conduit, and compressed air conduits interconnecting said air compressor and said jet units.

2. An apparatus as defined in claim 1 wherein said shaft is centrally provided with a fuel conduit, a fuel line connecting one end of said fuel conduit, and second fuel lines interconnecting the other end of said fuel conduit and said jet units.

References Cited in the file of this patent

UNITED STATES PATENTS

| | | |
|---|---|---|
| 2,501,078 | Newcomb | Mar. 21, 1950 |
| 2,644,298 | McLeod | July 7, 1953 |
| 2,650,666 | Dorand | Sept. 1, 1953 |
| 2,795,372 | Szydlowski | June 11, 1957 |